Feb. 7, 1933.                H. SHOEMAKER                1,896,468
ALTERNATING CURRENT RECTIFYING SYSTEM
Filed Oct. 4, 1926
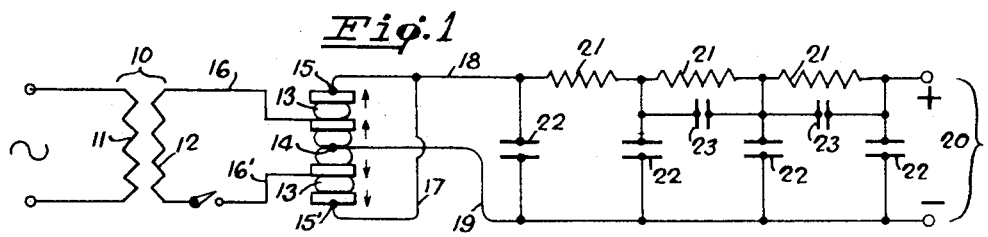
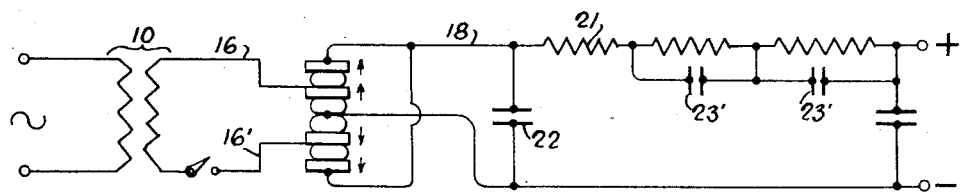
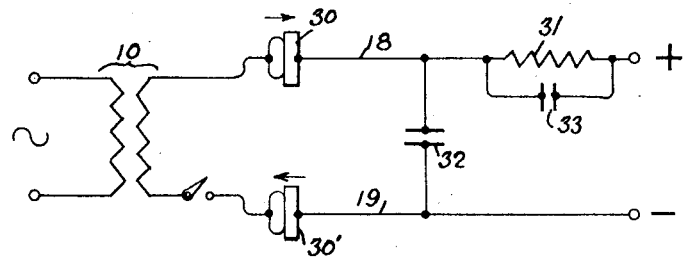
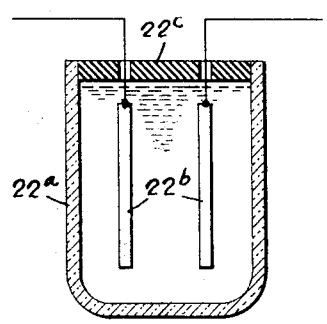
INVENTOR.
Harry Shoemaker
BY
Mayer, Warfield & Watson
ATTORNEYS.

Patented Feb. 7, 1933

1,896,468

UNITED STATES PATENT OFFICE

HARRY SHOEMAKER, OF JERSEY CITY, NEW JERSEY, ASSIGNOR, BY MESNE ASSIGN-MENTS, TO P. R. MALLORY & CO., INCORPORATED, OF INDIANAPOLIS, INDIANA, A CORPORATION OF INDIANA

ALTERNATING CURRENT RECTIFYING SYSTEM

Application filed October 4, 1926. Serial No. 139,424.

This invention relates to alternating current rectifying systems, and more particularly to systems utilizing as a rectifying means asymmetric couples of the dry surface-contact variety.

The object of the invention is generally to provide an improved system of the character specified, which is efficient, economical and readily manufactured.

More specifically an object is to provide a rectifying system which is noiseless and which is adapted to provide a low voltage source of direct current of such smoothness and uniformity as to be substantially "humless" when used as the current source for radio receiving systems, particularly when used as a source of filament-heating current.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claim.

For a fuller understanding of the nature and objects of the invention, reference should be had to the following detailed description taken in connection with the accompanying drawing, in which:

Figure 1 shows diagrammatically an electric rectifying system for alternating currents, constructed in accordance with the invention;

Figs. 2 and 3 show respectively in diagrammatic fashion modified electric rectifying systems in simplified form embodying the invention; and Fig. 4 shows in vertical cross section a polarization cell preferably used in connection with the invention.

Referring now to the drawing, and particularly to Fig. 1, 10 denotes an alternating current transformer having its primary 11 connected to a source of alternating current; for example a commercial source giving a 60-cycle 110-volt current. The secondary 12 of this transformer serves as the source of alternating current for the rectifying system shown. The rectifying means employed in the system here shown comprises two groups of asymmetric couples 13 inverted with respect to each other, there being a common or mid-terminal between the groups at 14. These groups each comprise a pair of couples having outer-end terminals at 15 and 15', respectively. The terminal conductors 16 and 16' leading from the secondary 12 are connected to intermediate points in the respective groups of couples at 13. Since the terminals 15 and 15' have like polarities, they are preferably conductively connected together; this is here indicated by the joining conductor 17. The terminals 14 and 15 of the rectifying means provide a source of direct current from which the output circuit, here shown as comprising conductors 18 and 19, leads for supplying a direct current-consuming device, indicated symbolically as plus and minus terminals at 20.

The asymmetric couples shown at 13 may comprise any convenient device having a so-called "valve" action and adapted for the unilateral passage of current; this characteristic is indicated by the arrows disposed adjacent the elemental couples at 13. The asymmetric couples preferred, however, are of the dry surface-contact variety, which are disclosed in the application for Letters Patent of the United States filed by Samuel Ruben on September 22, 1924, Serial No. 739,188, issued November 15, 1927, as Patent No. 1,649,741. It is seen that by employing the inverted groups of asymmetric couples, both halves of the alternating current wave are utilized for supplying direct current to the output circuit; for example, when the conductor 16 has a positive polarity, direct current will pass through the rectifying means and out into the conductor 18 to the direct current-consuming device, returning by way of the conductor 19 to the mid-terminal 14 of the rectifying means, and then passing in the direction indicated by the downwardly-poining arrow to the conductor 16'. When the polarity of the conductors 16 and 16' is reversed and the alternating current is passing through the other half of the cycle, it is seen that a current passing from the conductor 16', passes by way of the conductor 17 to the conductor 18 of the output circuit, returning by way of the conductors 19 and 16.

While the utilization of the full-wave from the alternating current source supplies relatively continuously direct current to the output circuit, still it is known that there are instants of current minima which occur during the reversal of the polarity of the alternating current. These minima, while not objectionable in a source of direct current when supplied to a relatively large variety of direct current-consuming devices, yet when supplying current for filament heating in electron discharge devices, such as the tubes used in radio-receiving systems and the like, which depend for their operation upon the phenomenon of thermo-electric discharges from incandescent cathodes, are highly objectionable. The hum experienced in the use of radio sets supplied with current in this manner, is known to be generally caused by the occurrence of these current minima.

Filter means have generally been associated with the direct current output circuits in rectifying systems of this character in order to "iron out", as it were, the hum to an unobjectionable extent. Such filter means heretofore has been inefficient and uneconomical.

By the present invention an improved filtering means is associated in the direct current output circuit. As here shown, this comprises a plurality of elements of inductance 21 disposed in series in one side of the direct current output circuit. These elements of inductance are shunted by means of capacitance elements 22 bridged across the line. Additional elements of capacitance are shown at 23, connected in parallel with the elements of inductance 21. In this arrangement it is not necessary that all the elements of inductance should have connected in parallel therewith additional elements of capacitance; consequently one element of inductance 21 is shown, at the left in the drawing, not so connected.

In operation, it is seen that the capacitance elements 23 serves as instantaneous current-storing means, which are charged by the current passing through the inductance, and are adapted to discharge during the instants of current minima. This discharge is directly into the elements of inductance; consequently an effective counter E. M. F. results in the inductance at 21, which, on account of the time element involved in the discharge of this circuit, operates as an attenuating means to prolong the discharge from the capacitance elements at 22 into the direct current output circuit.

The capacitance elements 22 in the arrangement of this invention are depended upon to supply the bulk of the current to the direct current output circuit during the instants of current minima; and consequently it is desired that they should have relatively great capacitance. For service, such as supplying filament heating current to radio-receiving systems, it is desired that the capacitance elements shall not only be large electrically but they shall be small physically and thereby occupy a relatively small space. This is conveniently attained by the use of polarization cells as the capacitance elements. Polarization cells of any convenient variety may be employed for this purpose, an aluminum electrolytic cell however is preferable; for example, a cell comprising plates of aluminum dipped in a film-forming electrolyte such as a solution of sodium borate. This construction is shown diagrammatically in Fig. 4, where 22a represents a container in which electrode elements 22b are disposed in a bath of electrolyte, the container being provided with an insulating cover 22c.

The arrangement shown in Fig. 2 is substantially similar to that shown in Fig. 1, except that the same number of shunt capacitance elements 22 is not employed. The effect of the discharge from the shunt capacitance elements 22 is attained in the arrangement shown in Fig. 2, by increasing the size of the capacitance elements at 23. The elements of increased size are here designated as 23'. In order that these capacitance elements may be relatively large electrically and yet occupy a relatively small space, polarization cells are also conveniently employed in this connection.

By this invention a rectifying system for supplying a direct current of several amperes capacity from an ordinary commercial source of alternating current, may be disposed in a container substantially no larger than ordinary storage batteries of for example 120 ampere-hour capacity now on the market. A system of this character in consequence is still adapted for use in supplying the filament-heating current required in modern multi-stage radio receiving sets.

In Fig. 3 a further simplified arrangement of output circuit is shown. Here it is desired to supply direct current by a relatively simple arrangement. The direct current output circuit is here indicated by the conductors at 18 and 19, which lead directly from the terminals of the alternating current transformer 10, to which are connected asymmetric couples 30 and 30'. In this arrangement the direct current output circuit is shunted by a single element of capacitance 32, which is associated with an element of inductance 31, having an instantaneous current-storing means 33, adapted to provide the effect of attenuating the discharge from the capacitance elements into the direct current circuit during the instants of current minima.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

In an electric rectifying system connected to a source of alternating current of relatively low voltage and frequency through dry surface rectifiers, a filter circuit comprising a plurality of similar units, each consisting of an inductance element connected in series with the positive side of said circuit and a polarization cell shunted across said circuit connected to the positive side of said circuit at the input end of the inductance element of said unit, and additional polarization cells connected in parallel with certain of said elements of inductance, and adapted to provide an attenuated supplemental discharge into the output end of said circuit during instants of current minima whereby relatively steady direct currents of relatively low voltage and high amperage may be had.

In testimony whereof I affix my signature.

HARRY SHOEMAKER.